No. 608,738. Patented Aug. 9, 1898.
A. WESTHEIMER.
PORTABLE COOKING UTENSIL.
(Application filed Mar. 1, 1898.)
(No Model.)
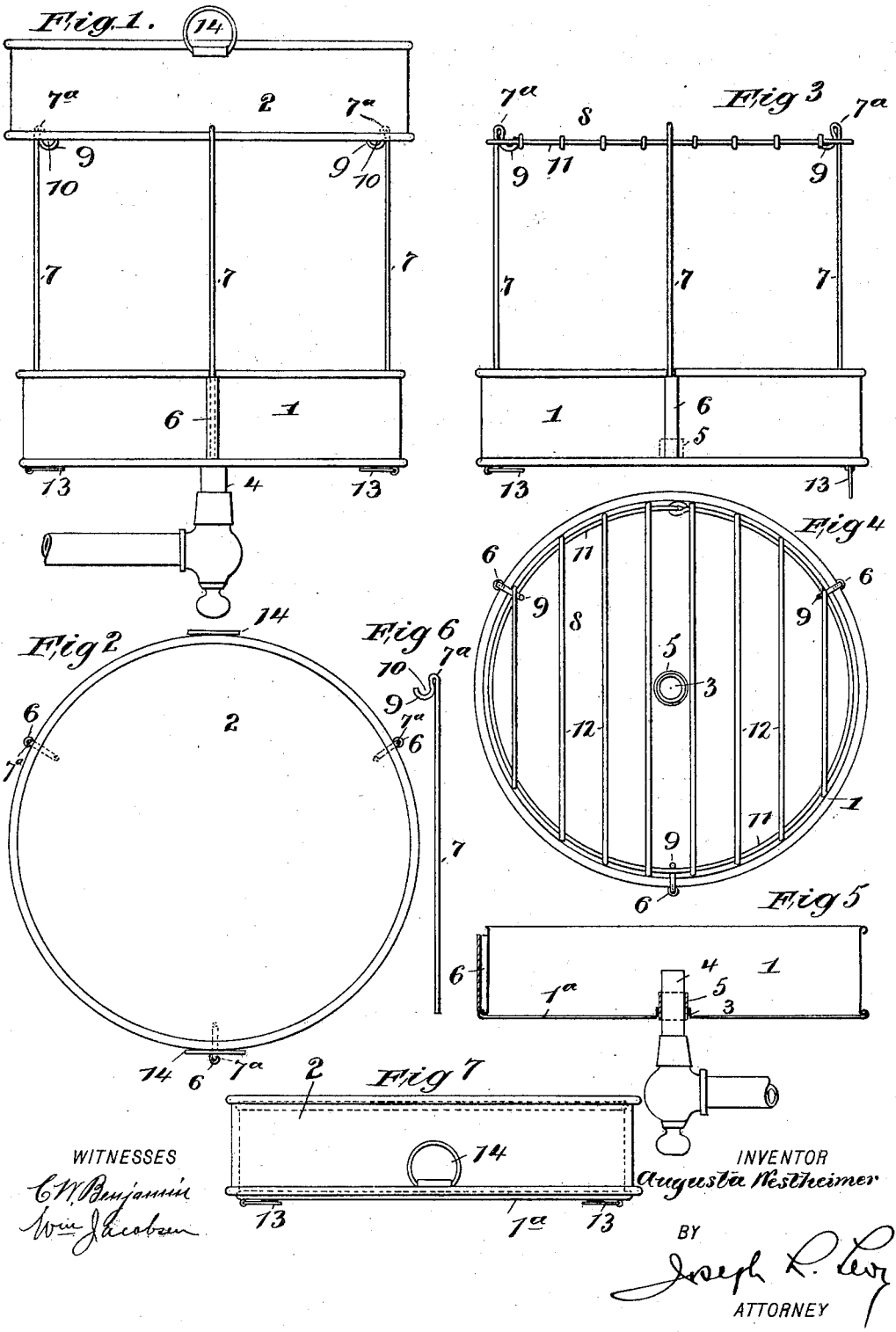
WITNESSES
INVENTOR
Augusta Westheimer
BY
Joseph R. Levy
ATTORNEY

UNITED STATES PATENT OFFICE.

AUGUSTA WESTHEIMER, OF NEW YORK, N. Y.

PORTABLE COOKING UTENSIL.

SPECIFICATION forming part of Letters Patent No. 608,738, dated August 9, 1898.

Application filed March 1, 1898. Serial No. 672,142. (No model.)

*To all whom it may concern:*

Be it known that I, AUGUSTA WESTHEIMER, a citizen of the United States, residing in the city, county, and State of New York, have invented a new and useful Portable Cooking Utensil, of which the following is a specification.

The object of my invention is to provide a cooking utensil that can be taken apart and packed in a small compass for transportation and which can be readily assembled for the purpose of conveniently cooking various articles, such as eggs, toast, tea, &c.

The invention consists in a pair of receptacles or pans adapted to fit one within the other, uprights, and means for supporting said uprights upon one pan, said uprights being provided with means for supporting one of the receptacles or pans.

The invention also consists in a pair of receptacles or pans adapted to fit one within the other, uprights, means for supporting said uprights upon one of the pans, and a gridiron adapted to be supported upon said uprights.

The invention also consists in the novel details of improvement and the combinations of parts that will be more fully hereinafter set forth, and then pointed out in the claims.

Reference is to be had to the accompanying drawings, forming a part hereof, wherein—

Figure 1 is a side elevation of my improvements shown in position upon a gas or other suitable burner and also showing one of the pans supported upon the uprights for heating water, &c. Fig. 2 is a plan view thereof. Fig. 3 is a side elevation of the device with the gridiron adjusted in position upon the uprights. Fig. 4 is a plan view thereof. Fig. 5 is a vertical cross-section through the lower receptacle or pan, showing it in position upon a gas-burner. Fig. 6 is a detail view of one of the uprights, and Fig. 7 is a side elevation of the device when the parts are all collected together for transportation.

In the accompanying drawings, in which similar numerals of reference indicate corresponding parts in the several views, 1 indicates a receptacle or pan of suitable area, and 2 is another receptacle or pan of similar shape, but preferably of sufficient size to receive the receptacle 1 within it, so that when they are placed together one will form a cover for the other.

The pan 1 is shown provided with a central aperture 3, adapted to receive a gas-burner, (the tube of an alcohol-lamp or other suitable generator,) and 5 is a ferrule or tube extending inwardly from aperture 3 and secured to the bottom of pan 1, whereby said pan may be balanced upon the burner 4.

The tube 5 preferably projects somewhat above the inner face of the bottom $1^a$ of pan 1, by which means liquid, juice, and other drippings can be caught and retained in the receptacle.

The receptacle or pan 1, which is primarily the holder and can be used as a drip-pan, is provided with a number of sockets 6, which are preferably placed upon the exterior, and these sockets are adapted to receive detachable uprights 7, upon which the receptacle 2 and a gridiron 8 are adapted to be alternatively supported.

The uprights 7 are shown in the form of rods and at their upper ends are provided with extensions or hooks 9, upon which the receptacle 2 and the gridiron 8 are adapted to be supported. I have shown the extensions 9 in the form of loops or hooks bent from the rod 8 and provided with recesses 10, in which the annular portion or ring 11 of the gridiron 8 is adapted to rest. By this means the gridiron will be retained in position without danger of its being knocked from the uprights 7. Furthermore, the diameter of the receptacle 2 is such that it will rest upon the extensions 9 between the upper ends $7^a$ of the uprights 7, so as to be properly retained in position thereon. It will be seen that the uprights 7 are removably connected with the sockets 6, so that they can be removed and laid within the receptacle 1, as they are not longer than the diameter of said receptacle.

The gridiron 8 is shown composed of a ring 11, suitably fastened at its ends and provided with cross-bars 12, suitably connected with such ring, the parts 11 and 12 preferably being made of wire. The diameter of the gridiron is such that it will fit conveniently within the receptacle 1. The receptacles 1 and 2 are shown provided with loops or rings 13 14, by which they can be readily handled.

When the device is to be packed for transportation, the uprights 7 and gridiron 8 are placed within the receptacle 2, and the receptacle 1 is then placed within the receptacle 2 to cover and retain the other parts. (See Fig. 7.)

When it is desired to use the device—say, for instance, for making tea or coffee—the receptacles 1 and 2 are separated, the uprights 7 are adjusted in the sockets 6 of receptacle 1, the latter is placed upon the gas-burner, and the receptacle 2 is placed upon the extensions 9 of the uprights 7. If instead of using the receptacle 2 it is desired to make toast or broil some other article, the gridiron 8 is placed upon the extensions 9, as shown in Fig. 3.

I do not limit my invention to the precise details of construction shown and described, as they may be varied without departing from the spirit thereof.

Having now described my invention, what I claim is—

1. A portable cooking device comprising a pan or holder 1, uprights, means for detachably securing the said uprights to said holder, the uprights being of a length to fit within said holder, and a cook-pan 2 adapted to be supported upon said uprights and to form a cover for said holder 1, substantially as described.

2. A portable cooking device comprising a drip-pan or holder 1, having an aperture adapted to fit upon a gas-burner or the like, uprights, means for detachably securing the uprights to the drip-pan, the uprights being of a length to fit into the drip-pan, and a cook-pan adapted to be supported upon said uprights and to form a cover for the drip-pan, substantially as described.

3. A portable cooking device comprising a drip-pan or holder 1 having an aperture and a tube or ferrule projecting inwardly from the holder, uprights, means for detachably securing the uprights to said holder, and a cook-pan 2 adapted to be supported upon said uprights and to form a cover for the said holder, substantially as described.

4. A portable cooking device comprising a holding or carrying receptacle 1, uprights 7 of a length to fit in the holder and having extensions 9, sockets 6 in the holder 1 to receive the ends of said uprights, and a receptacle or support adapted to be placed upon said extensions, and to form a cover for the holder 1, substantially as described.

5. A portable cooking device comprising a drip-pan or holder 1, uprights 7 of a length to fit in the holder and having extensions 9 provided with recesses 10, sockets 6 in the holder to receive the ends of said uprights, and a gridiron adapted to be hung upon said extensions and within said recesses and of a size to fit into said holder, substantially as described.

6. A portable cooking device comprising a pan 1 having exterior sockets 6, uprights of a size to fit in the pan 1, a cook-pan 2 adapted to receive the pan 1, the uprights comprising the rods 7 having upper bent ends to receive the pan 2, their lower ends fitting in the sockets 6, substantially as described.

7. A portable cooking device comprising two receptacles one adapted to fit within the other, uprights, means for detachably connecting them with one of the receptacles, and a gridiron adapted to fit within said receptacles, and means for supporting said gridiron and one of the receptacles upon said uprights, substantially as described.

Signed in the city, county, and State of New York this 28th day of February, 1898.

AUGUSTA WESTHEIMER.

Witnesses:
JOSEPH L. LEVY,
WM. JACOBSEN.